(12) United States Patent
O'Dell et al.

(10) Patent No.: US 12,135,630 B2
(45) Date of Patent: Nov. 5, 2024

(54) AUTOMATIC NON-CODE TEST SUITE GENERATION FROM API SPECIFICATION

(71) Applicant: Salesforce, Inc., San Francisco, CA (US)

(72) Inventors: Robert O'Dell, Bellevue, WA (US); Nicolas Battiato, Buenos Aires (AR); Diego Larralde, Buenos Aires (AR); Guido Martinez, Buenos Aires (AR)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/589,586

(22) Filed: Jan. 31, 2022

(65) Prior Publication Data
US 2023/0088655 A1    Mar. 23, 2023

Related U.S. Application Data

(60) Provisional application No. 63/246,145, filed on Sep. 20, 2021.

(51) Int. Cl.
*G06F 11/36*    (2006.01)

(52) U.S. Cl.
CPC ...... *G06F 11/3608* (2013.01); *G06F 11/3684* (2013.01)

(58) Field of Classification Search
None
See application file for complete search history.

(56) References Cited

U.S. PATENT DOCUMENTS

| | | | | |
|---|---|---|---|---|
| 10,437,712 | B1* | 10/2019 | Tyler | G06F 11/3684 |
| 2014/0289699 | A1* | 9/2014 | Paterson | G06F 11/3684 |
| | | | | 717/106 |
| 2017/0300402 | A1* | 10/2017 | Hoffner | G06F 11/3684 |
| 2018/0324132 | A1* | 11/2018 | Barnard | G06F 9/542 |
| 2019/0196890 | A1* | 6/2019 | Bucchi | G06F 16/951 |
| 2019/0197111 | A1* | 6/2019 | Garrote | G06F 40/30 |
| 2020/0233790 | A1* | 7/2020 | Battaglia | H04L 67/02 |

(Continued)

OTHER PUBLICATIONS

H. Ed-douibi, J. L. Cánovas Izquierdo and J. Cabot, "Automatic Generation of Test Cases for REST APIs: A Specification-Based Approach," 2018 IEEE 22nd International Enterprise Distributed Object Computing Conference (EDOC), Stockholm, Sweden, 2018, pp. 181-190, doi: 10.1109/EDOC.2018.00031. (Year: 2018).*

(Continued)

*Primary Examiner* — Andrew M. Lyons
(74) *Attorney, Agent, or Firm* — Sterne, Kessler, Goldstein & Fox P.L.L.C.

(57) ABSTRACT

Disclosed herein are system, method, and computer program product embodiments for automatic non-code test suite generation of an application programming language (API) specification. An embodiment operates by receiving a specification of an API, wherein the API comprises a plurality of endpoints. The embodiment generates, using a parser, an abstraction model corresponding to the specification of the API, wherein the abstraction model comprises a plurality of entities corresponding to the plurality of endpoints. The embodiment identifies, based on the abstraction model, an operation that is applicable to an entity of the plurality of entities. The embodiment then generates a functional test based on a use case corresponding to the entity and the operation.

20 Claims, 5 Drawing Sheets

(56) References Cited

U.S. PATENT DOCUMENTS

| | | | |
|---|---|---|---|
| 2020/0334134 A1* | 10/2020 | Kalyanaraman | G06F 11/3688 |
| 2021/0042207 A1* | 2/2021 | Joyce | G06F 11/3612 |
| 2021/0133091 A1* | 5/2021 | Pillai | G06F 11/3604 |
| 2022/0283929 A1* | 9/2022 | Singh | G06F 9/541 |

OTHER PUBLICATIONS

S. Karlsson, A. Causevic and D. Sundmark, "QuickREST: Property-based Test Generation of OpenAPI-Described RESTful APIs," 2020 IEEE 13th International Conference on Software Testing, Validation and Verification (ICST), Porto, Portugal, 2020, pp. 131-141, doi: 10.1109/ICST46399.2020.00023. (Year: 2020).*

D. Corradini, A. Zampieri, M. Pasqua and M. Ceccato, "Restats: A Test Coverage Tool for RESTful APIs," 2021 IEEE International Conference on Software Maintenance and Evolution (ICSME), Luxembourg, 2021, pp. 594-598. (Year: 2021).*

\* cited by examiner

AUTOMATIC NON-CODE TEST SUITE GENERATION FROM API SPECIFICATION

CROSS-REFERENCE TO RELATED APPLICATIONS

This application claims the benefit of U.S. Provisional Patent Application No. 63/246,145 by O'Dell, et al., titled "Automatic Non-Code Test Suite Generation from API Specification," filed on Sep. 20, 2021, which is incorporated by reference herein in its entirety.

BACKGROUND

Representational state transfer (REST) web services (or, RESTful web services) are services satisfying several core principles of REST, such as the use of stateless operations, client-server relationships, and unique identification of resources through a uniform resource identifier (URI). Commonly, requests to these RESTful web services are made through Hypertext Transfer Protocol (HTTP) requests, that include instructions such as GET (to read a resource at a URI), PUT (to update a resource at the URI), DELETE (to remove a resource at the URI), and POST (to create a new resource).

These services may be developed and implemented in conformance with the use of an Application Program Interface (API). The API defines how requests are made and answered by the service. Developers can generate APIs through the use of API specifications, which in the context of RESTful web services are often defined in languages such as RESTful API Modeling Language (RAML), OpenAPI Specification (OAS), GraphQL, or gRPC Remote Procedure Call format.

Testing a RESTful web service API (REST API) is commonly handled by generating test suites, commonly with tools such as Apache JMeter, JUnit, or Blackbox API Tester (BAT). However, generating test suites with each of these tools requires manually defining test parameters and conditions.

Accordingly, what is needed are automated tools for testing REST APIs.

BRIEF DESCRIPTION OF THE DRAWINGS

The following figures use like reference numbers to refer to like elements. Although the following figures depict various example implementations, alternative implementations are within the spirit and scope of the appended claims. In the drawings:

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for automatic generation of test suites for verifying the operation of REST APIs.

In order to test REST APIs, a testing framework such as Apache JMeter (for example) may be used to write tests, as well as to compile multiple tests into a test suite. A testing framework allows for connection to a service, such as a RESTful web service, and the sending of requests to the service in order to receive a response. A test involves determining whether the response is or is not what was expected.

While REST API testing frameworks allow for robust implementation of tests and test suites, a test developer must still envision all of the testing scenarios and write the tests specific to a particular API. This requires drafting a test for each possible use case, specific for a particular API. In addition, if testing multiple APIs, drafting a test for each possible use case becomes an exponentially complex problem for test development.

In some cases, the API may have been designed and generated through the use of an API specification, such as RAML or OAS, by way of non-limiting example. A test developer may reference the API specification in order to determine which requests to make for testing purposes and then use the received responses to verify correct behavior. In some embodiments, web service providers or other cloud service providers (e.g., provided using web servers, application (app) servers, or other servers or appliances) can provide APIs for interacting with their services. These APIs, such as REST APIs or other APIs, can be published and defined in a specification. In some embodiments, based on an API specification, a test suite generation tool can automatically crated test suites corresponding to the API specification without user intervention.

Figure 1:
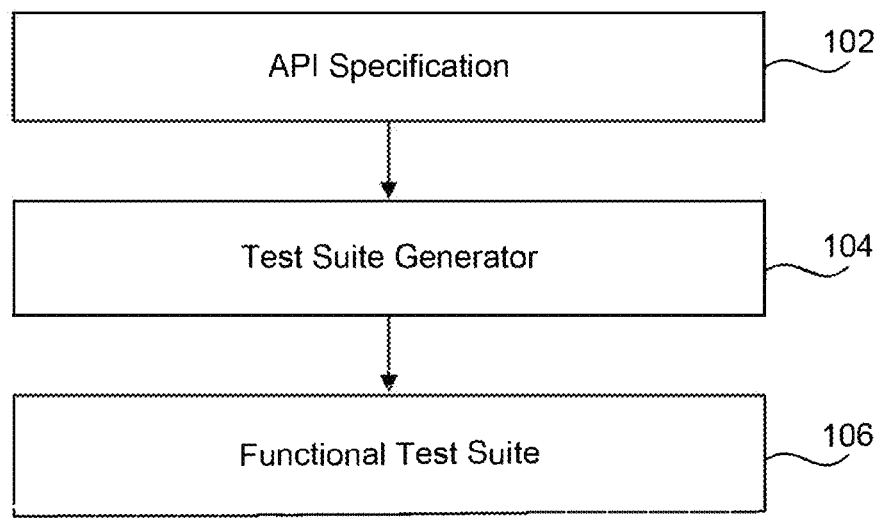
FIG. 1 is a flowchart illustrating steps by which a functional test suite is generated, according to some embodiments.

Embodiments disclosed herein provide modules and functions for the automatic generation of a functional test suite based on an API specification FIG. 1 is a flowchart 100 illustrating steps by which a functional test suite is generated, in accordance with an embodiment. An API specification 102 is provided to test suit generator 104. The test suit generator 104 translates an API specification into an abstraction model, for example, a domain-specific model. In some embodiments, the domain-specific model is based on anything modeling language (AML) modeling framework. In some embodiments, test suite generator 104 generates a functional test suite 106 based on the abstraction model.

API specification 102 may detail bow to use or interface with the API for communication. For example, API specification may define API objects, values and parameters, how the API objects are called, and what each object does. Further, API specification 102 can be provided in one or more formats that can be parsed, processed, and used for automated test suite generation. Example API specification formats include the RESTful API Modeling Language (RAML) specification, Apiary's API Blueprint, Reverb's Swagger Specification, W3C's Web Application Description Language (WADL) standard, or another format or modeling language that can be used for providing an API specification to generally define an API's endpoints and expected parameters, which can be consumed and processed by the test suit generation tool 104, as further described herein.

Figure 2:
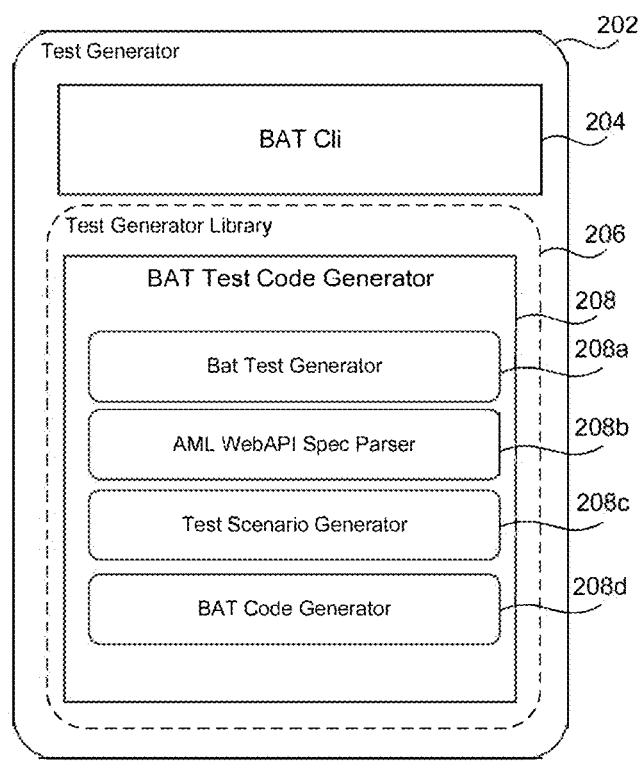
FIG. 2 illustrates a functional block diagram illustrating a functional test generator tool, according to some embodiments.

FIG. 2 is a functional block diagram illustrating a functional test generator tool, according to some embodiments. In some embodiments, the test suite generation tool 202 can be implemented as test suite generator 104 in FIG. 1.

In accordance with some embodiments, test suite generation tool 202 can be implemented using a command-line interface (CLI) 204 and/or an application service. For example, test generator tool 202 an be implemented using a black box API testing (BAT) CLI. In accordance with some embodiments, the test suite generation tool 202 can be implemented in a development pipeline. Implementing a test suite generation tool in a development pipeline provides continuous integration and continuous deployment (CI/CD) of updated API implementation. As developers continue to update API implementations or release new versions, a test generation tool can automatically generate functional test cases to test the updated specifications. By implementing an automatic test suite generation tool, API development systems may streamline the deployment and publication of new API versions. Further, implementing the automatic cataloging tool allows developers to focus on building and implementing APIs. This automation and self-discovery of updated API specifications may reduce wasted computer resources corresponding to developer intervention.

According to some embodiments, test generation tool includes a test generator library 206. The test generator library 206 includes a BAT test generator 206a, an AML WebAPI specification parser 206b, a test scenario generator 206c, and a BAT code generator 206d.

According to some embodiments, an abstraction model corresponding to the received API is generated using a specification parser. The abstraction model may be independent of the format of the received specification. In some embodiments, an anytime modeling language (AML) WebAPI specification parser 208b may generate an abstraction model. According to an embodiment, the abstraction model may be based on AML modeling framework. According to an embodiment, the abstraction model may be a domain-specific model. In some embodiments, the abstraction model may define one or more entities, each corresponding to an endpoint of the received specification. In some embodiments, an entity represents an API endpoint and includes a path and a set of operations.

Test scenario generator 208c may identify use cases based on an abstraction model. In some embodiments, one or more operations that are applicable to an entity may be identified by test scenario generator 208c. In some embodiments, information related to data type and response codes corresponding to response elements may be identified from the abstraction model. In some embodiments, information corresponding to parameters of the applicable operations may be identified from the abstraction model. A parameter may be identified as a required parameter or an optional parameter corresponding to a message. In some embodiments, formats of API requests and corresponding response data may be identified from the abstraction model.

BAT code generator 208d may generate functional tests corresponding to the use cases generated by test scenario generator 208c. In some embodiments, use cases corresponding to an entity and an operation are identified to generate tests corresponding to the entity. In some embodiments, a function test is generated by the test generator tool 202 based on use cases that ensure that the API implementation is functioning as per a requirements specification. In some embodiments, a use case may correspond to verifying response payload, for example correct field names, types, and values, as non-limiting examples. In some embodiments, a use case may correspond to verifying response headers. In some embodiments, a functional test may be generated to test a happy path test to check basic functionality. In some embodiments, use cases corresponding to testing security attributes of a system may be identified from the abstraction model.

Figure 3:
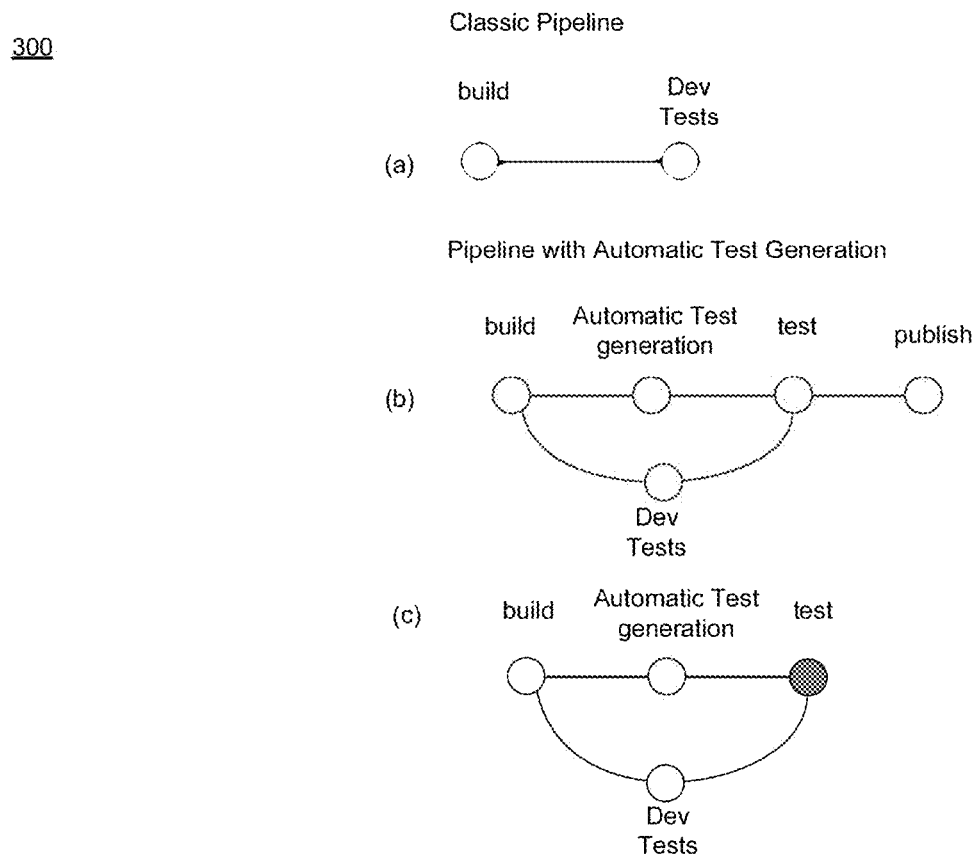
FIG. 3 illustrates integrating an automated test generation tool into a development pipeline, according to some embodiments.

FIG. 3 illustrates an advantage of integrating automated test generation tool 202 into a software development pipeline. FIG. 3(*a*) illustrates a regular development pipeline in which a build is generated, and one or more functional tests are manually generated. In a regular pipeline, unless a test is coded in advance, a developer cannot determine in advance whether a change in a build might result in the failure of an application. FIGS. 3(*b*) and 3(*c*) illustrate a development pipeline with an integrated automatic test generation tool. In some embodiments, the development pipeline is a continuous integration/continuous development (CI/CD) pipeline. Integrating the test generation tool into the development pipeline enables the automatic generation of tests for each updated build. As a result, a developer can know immediately whether a change in an API specification is implemented in the service and whether a definition specified in a web specification is being followed.

Figure 4:
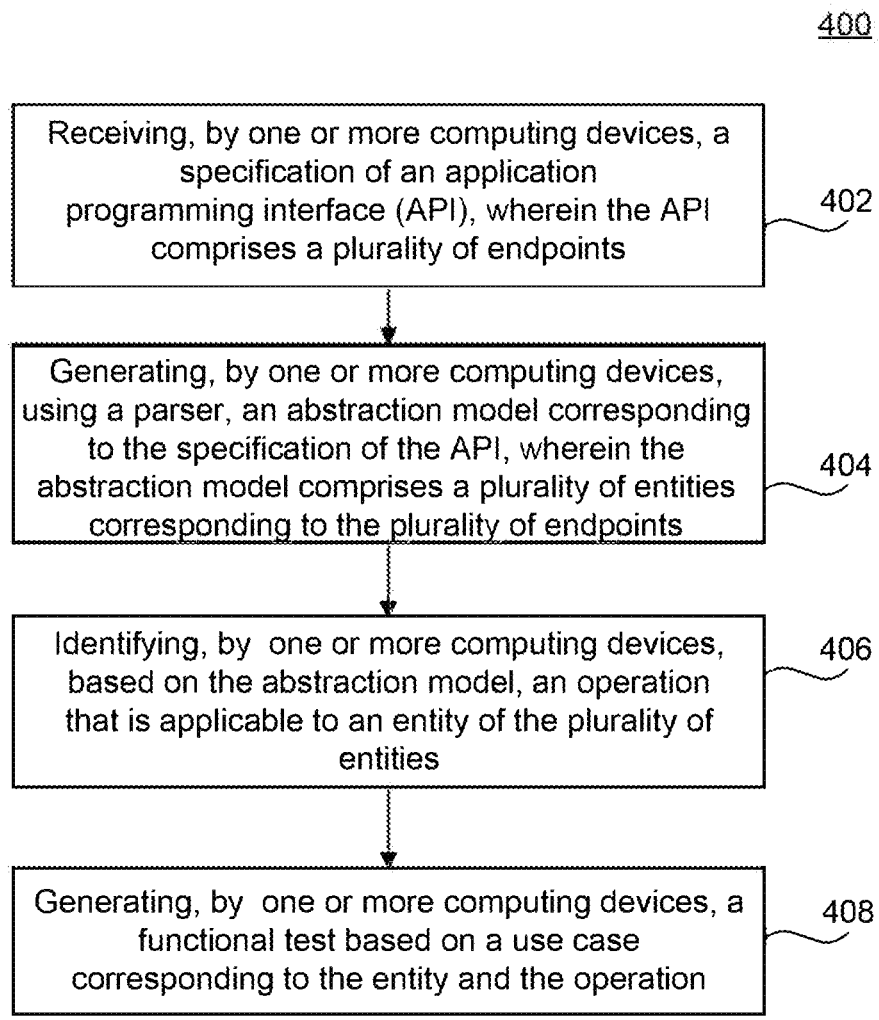
FIG. 4 is a flow chart illustrating the steps by which a functional test suite is generated, according to some embodiments.

FIG. 4 is a flow chart 400 illustrating steps by which a test suite is generated, in accordance with an embodiment. In accordance with an embodiment, these steps are performed by an automatic test-suite generator, such as test suite generator 202 in FIG. 2. However, one skilled in the relevant arts will appreciate that these steps may be performed by any combination of software and/or hardware components.

At 402, a specification of an application programming interface (API) with one or more endpoints is received by test generator tool 202. In some embodiments, the received specification may be in one of the following formats: include the RESTful API Modeling Language (RAML) specification, RESTful API Modeling Language (RAML), OpenAPI Specification (OAS), GraphQL, or gRPC Remote Procedure Call format Apiary's API Blueprint, Reverb's Swagger Specification, W3C's Web Application Description Language (WADL) standard.

At 404, an abstraction model corresponding to the received API is generated using a specification parser. The abstraction model may be independent of the format of the received specification. In some embodiments, the parser is an anytime modeling language (AML) WebAPI specification parser. According to an embodiment, the abstraction model is based on AML modeling framework. In some embodiments, the abstraction model is based on an openAPI framework. According to an embodiment, the abstraction model may be a domain-specific model. In some embodiments, the abstraction model may define one or more entities, each corresponding to an endpoint of the received specification. In some embodiments, an entity represents an API endpoint and includes a path and a set of operations. An operation may correspond to a fetch, create, list, delete, update, or another data operation. Further, an operation may be associated with an operation identifier, one or more parameters, and predefined responses.

At 406, based on the abstraction model, one or more operations that are applicable to an entity of the plurality of entities may be identified by test scenario generator 208c. In some embodiments, information related to data type and response codes corresponding to response elements may be identified from the abstraction model. In some embodiments, information corresponding to parameters of the applicable operations may be identified from the abstraction model. A parameter may be identified as a required parameter or an optional parameter corresponding to a message. In some embodiments, a format of an API request and corresponding response data may be identified from the abstraction model.

At 408, a functional test can be generated, by BAT code generator 208*d*, based on use cases identified based on the abstraction model. In some embodiments, use cases corresponding to an entity and an operation are identified to generate tests corresponding to the entity. In some embodiments, a function test is generated by the test generator tool 202 based on use cases that ensure that the API implementation is functioning as per a requirements specification. In some embodiments, a use case may correspond to verifying response pay load, for example correct field names, types, and values, as non-limiting examples. In some embodiments, a use case may correspond to verifying response headers. In some embodiments, a functional test may be generated to test a happy path test to check basic functionality. In some embodiments, use cases corresponding to testing security attributes of a system may be identified form the abstracting model.

In some embodiments, use cases are automatically generated corresponding to various operations that may be performed on the entities identified from the abstraction model. In some embodiments, use cases may correspond to various expected response values based on request conditions. In some embodiments, use cases corresponding to verification of various status codes are identified, and tests corresponding to the use cases are automatically generated.

The method steps of FIG. 4 may be performed in any conceivable order, and it is not required that all steps be performed. Moreover, the method steps of FIG. 4 described above merely reflect an example of steps and are not limiting. That it, further method steps and functions may be envisaged based upon embodiments described in reference to FIGS. 1, 2, 3, and 5.

Figure 5:
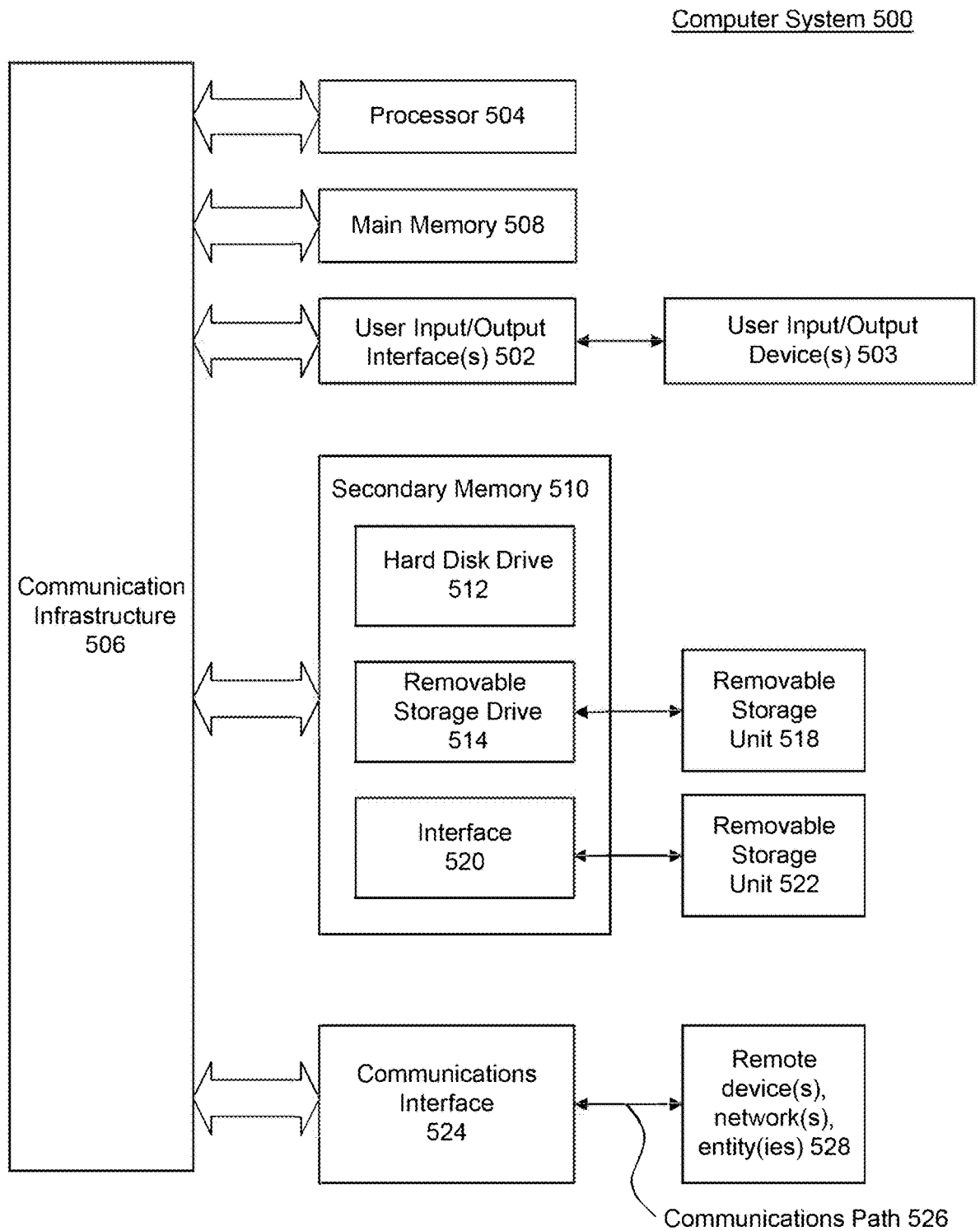
FIG. 5 is an example computer system useful for implementing various embodiments.

Various embodiments can be implemented, for example, using one or more well-known computer systems, such as computer system 500 shown in FIG. 5. One or more computer systems 500 can be used, for example, to implement any of the embodiments discussed herein, as well as combinations and sub-combinations thereof.

Computer system 500 can include one or more processors (also called central processing units, or CPUs), such as a processor 504. Processor 504 can be connected to a communication infrastructure or bus 506.

Computer system 500 can also include customer input/output device(s) 503, such as monitors, keyboards, pointing devices, etc., which can communicate with communication infrastructure 506 through customer input/output interface(s) 502.

One or more of processors 504 can be a graphics processing unit (GPU). In an embodiment, a GPU can be a processor that is a specialized electronic circuit designed to process mathematically intensive applications. The GPU can have a parallel structure that is efficient for parallel processing of large blocks of data, such as mathematically intensive data common to computer graphics applications, images, videos, etc.

Computer system 500 can also include a main or primary memory 508, such as random access memory (RAM). Main memory 508 can include one or more levels of cache. Main memory 508 can have stored therein control logic (i.e., computer software) and/or data.

Computer system 500 can also include one or more secondary storage devices or memory 510. Secondary memory 510 can include, for example, a hard disk drive 512 and/or a removable storage device or drive 514. Removable storage drive 514 can be a floppy disk drive, a magnetic tape drive, a compact disk drive, an optical storage device, tape backup device, and/or any other storage device/drive.

Removable storage drive 514 can interact with a removable storage unit 518. Removable storage unit 518 can include a computer usable or readable storage device having stored thereon computer software (control logic) and/or data. Removable storage unit 518 can be a floppy disk, magnetic tape, compact disk, DVD, optical storage disk, and/any other computer data storage device. Removable storage drive 514 can read from and/or write to removable storage unit 518.

Secondary memory 510 can include other means, devices, components, instrumentalities or other approaches for allowing computer programs and/or other instructions and/or data to be accessed by computer system 500. Such means, devices, components, instrumentalities or other approaches can include, for example, a removable storage unit 522 and an interface 520. Examples of the removable storage unit 522 and the interface 520 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 can further include a communication or network interface 524. Communication interface 524 can enable computer system 500 to communicate and interact with any combination of external devices, external networks, external entities, etc. (individually and collectively referenced by reference number 528). For example, communication interface 524 can allow computer system 500 to communicate with external or remote devices 528 over communications path 526, which can be wired and/or wireless (or a combination thereof), and which can include any combination of LANs, WANs, the Internet, etc. Control logic and/or data can be transmitted to and from computer system 500 via communication path 526.

Computer system 500 can also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 can be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (Baas), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 can be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas can be used, either exclusively or in combination with known or open standards.

In some embodiments, a tangible, non-transitory apparatus or article of manufacture comprising a tangible, non-transitory computer useable or readable medium having control logic (software) stored thereon can also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), can cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method, comprising:
generating, by one or more computing devices, using a parser and a modeling language, a domain-specific abstraction model corresponding to a specification of an application programming interface (API), the domain-specific abstraction model defining one or more entities each corresponding to an endpoint of the API and each comprising a path and a set of operations available at the endpoint;
identifying, by the one or more computing devices, based on the domain-specific abstraction model, use cases for each endpoint and each operation in the set of operations at each endpoint, each use case comprising an operation in the set of operations available at the endpoint, a request format, a required parameter, an optional parameter, one or more expected response headers, and an expected response value; and
in response to a build in a development pipeline, the build including an update made to the API by a developer in the development pipeline, generating, by the one or more computing devices, a functional test that for each of the use cases: transmits the operation to the endpoint via the path in the request format with the required parameter and verifies that a received response code matches the expected response value and that one or more headers in a response payload from the API match the one or more expected headers.

2. The method of claim 1, wherein the generating the domain-specific abstraction model is based on an open API framework.

3. The method of claim 1, wherein the specification is defined in a RESTful API Modeling Language (RAML) file, an Open API Specification (OAS), a GraphQL, or a gRPC Remote Procedure Call format.

4. The method of claim 1, wherein the operation is one of a fetch, a create, a list, a delete, or an update.

5. The method of claim 1, wherein the operation performs a happy path test.

6. The method of claim 1, wherein the use cases test one or more security attributes.

7. The method of claim 1, wherein the set of operations available at the endpoint comprises a get, a put, a delete, and a post.

8. A system, comprising:
a memory; and
at least one processor coupled to the memory and configured to:
generate, using a parser and a modeling language, a domain-specific abstraction model corresponding to a specification of an application programming interface (API), the domain-specific abstraction model defining one or more entities each corresponding to an endpoint of the API and each comprising a path and a set of operations available at the endpoint;

identify, based on the domain-specific abstraction model, use cases for each endpoint and each operation in the set of operations at each endpoint, each use case comprising an operation in the set of operations available at the endpoint, a request format, a required parameter, an optional parameter, one or more expected response headers, and an expected response value; and in response to a build in a development pipeline, the build including an update made to the API by a developer in the development pipeline, generate a functional test that for each use case of the use cases: transmits the operation to the endpoint via the path in the request format with the required parameter and verifies that a received response code matches the expected response value and that one or more headers in a response payload from the API match the one or more expected headers.

9. The system of claim 8, wherein the generating the domain-specific abstraction model is based on an open API framework.

10. The system of claim 8, wherein the specification is defined in a RESTful API Modeling Language (RAML) file, an Open API Specification (OAS), a GraphQL, or a gRPC Remote Procedure Call format.

11. The system of claim 8, wherein the operation is one of a fetch, a create, a list, a delete, or an update.

12. The system of claim 8, wherein the operation performs a happy path test.

13. The system of claim 8, wherein the use cases test one or more security attributes.

14. The system of claim 8, wherein the set of operations available at the endpoint comprises a get, a put, a delete, and a post.

15. A non-transitory computer-readable device having instructions stored thereon that, when executed by at least one computing device, causes the at least one computing device to perform operations comprising:

generating, using a parser and a modeling language, a domain-specific abstraction model corresponding to a specification of an application programming interface (API), the domain-specific abstraction model defining one or more entities each corresponding to an endpoint of the API and each comprising a path and a set of operations available at the endpoint;

identifying based on the domain-specific abstraction model, use cases for each endpoint and each operation in the set of operations at each endpoint, each use case comprising an operation in the set of operations available at the endpoint, a request format, a required parameter, an optional parameter, one or more expected response headers, and an expected response value; and in response to a build in a development pipeline, the build including an update made to the API by a developer in the development pipeline, generating a functional test that for each of the use cases: transmits the operation to the endpoint in the request format with the required parameter and verifies that a received response code matches the expected response value and that one or more headers in a response payload from the API by match the one or more expected headers.

16. The non-transitory computer-readable device of claim 15, wherein the generating the domain-specific abstraction model is based on an open API framework.

17. The non-transitory computer-readable device of claim 15, wherein the specification is defined in a RESTful API Modeling Language (RAML) file, an Open API Specification (OAS), a GraphQL, or a gRPC Remote Procedure Call format.

18. The non-transitory computer-readable device of claim 15, wherein the operation is one of a fetch, a create, a list, a delete, or an update.

19. The non-transitory computer-readable device of claim 15, wherein the operation performs a happy path test.

20. The non-transitory computer-readable device of claim 15, wherein the set of operations available at the endpoint comprises a get, a put, a delete, and a post.

* * * * *